US011884072B2

(12) United States Patent
Yoshino et al.

(10) Patent No.: US 11,884,072 B2
(45) Date of Patent: Jan. 30, 2024

(54) LIQUID DISCHARGE HEAD

(71) Applicant: BROTHER KOGYO KABUSHIKI KAISHA, Nagoya (JP)

(72) Inventors: Takaaki Yoshino, Nagoya (JP); Taisuke Mizuno, Yokkaichi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 22 days.

(21) Appl. No.: 17/723,641

(22) Filed: Apr. 19, 2022

(65) Prior Publication Data

US 2022/0379610 A1 Dec. 1, 2022

(30) Foreign Application Priority Data

May 28, 2021 (JP) ................................ 2021-089796

(51) Int. Cl.
*B41J 2/14* (2006.01)

(52) U.S. Cl.
CPC ....... *B41J 2/14233* (2013.01); *B41J 2/14274* (2013.01); *B41J 2002/14306* (2013.01); *B41J 2002/14362* (2013.01); *B41J 2002/14411* (2013.01)

(58) Field of Classification Search
CPC ................ B41J 2/14233; B41J 2/14274; B41J 2002/14306; B41J 2002/14362; B41J 2002/14411
See application file for complete search history.

(56) References Cited

U.S. PATENT DOCUMENTS 7,625,076 B2 * 12/2009 Ito ........................ B41J 2/14209 347/70
2008/0204522 A1 8/2008 Kajiura et al.
2011/0292130 A1 12/2011 Hayashi
2020/0376839 A1 12/2020 Hirai et al.

FOREIGN PATENT DOCUMENTS

JP 2008-207363 A 9/2008
JP 2011-245726 A 12/2011
JP 2016-68404 A 5/2016
JP 2020-196202 A 12/2020

* cited by examiner

*Primary Examiner* — Geoffrey S Mruk
(74) *Attorney, Agent, or Firm* — Merchant & Gould, P.C.

(57) ABSTRACT

A liquid discharge head includes a flow passage substrate which is formed with individual flow passages, the individual flow passages including nozzles and pressure chambers communicated with the nozzles respectively, the pressure chambers being open on a surface of the flow passage substrate; a sealing member which is adhered to the surface via an adhesive and which seals the pressure chambers; and an actuator substrate which has a piezoelectric layer adhered to a surface of the sealing member on a side opposite to the flow passage substrate via an adhesive and individual electrodes formed on a side opposite to the sealing member with respect to the piezoelectric layer. The sealing member is composed of a material different from a material of the piezoelectric layer; and the surface has an adhesion area to which the sealing member is adhered and a non-adhesion area to which the sealing member is not adhered.

14 Claims, 8 Drawing Sheets

LIQUID DISCHARGE HEAD

CROSS REFERENCE TO RELATED APPLICATIONS

The present application claims priority from Japanese Patent Application No. 2021-089796, filed on May 28, 2021, the disclosure of which is incorporated herein by reference in its entirety.

BACKGROUND

The present invention relates to a liquid discharge head provided with a flow passage substrate, a sealing member, and an actuator substrate which are adhered to one another via an adhesive.

Conventionally, a liquid discharge apparatus is known, in which an ink sealing film (sealing member) is adhered to a surface of a flow passage unit (flow passage substrate), and a piezoelectric layer is adhered to a surface of the ink sealing film. In this liquid discharge apparatus, a film, which is formed of a material having a low ink permeability, for example, a metal material such as stainless steel or the like, can be preferably used as the ink sealing film (sealing member).

SUMMARY

In the case of the liquid discharge apparatus described above, the sealing member is provided between the flow passage substrate and the piezoelectric layer. On this account, even if any crack appears in the piezoelectric layer, then no liquid enters the crack of the piezoelectric layer, and it is possible to avoid the inconvenience (for example, short circuit formation in an electrode layer) which would be otherwise caused by the invasion of the liquid into the crack.

However, the sealing member is adhered to the surface of the flow passage substrate, and the piezoelectric layer is adhered to the surface of the sealing member. On this account, the total amount of the adhesive is increased, and a surplus or excessive amount of the adhesive, which is in a large amount, may protrude from any interstice between these members. In such a situation, a problem may arise such that the adhesive adheres to other members (for example, the flow passage substrate, the sealing member, and the pressurizing apparatus to be used for the adhesion of the actuator substrate). If the adhesive adheres to the pressurizing apparatus, when any distinct member is assembled to a stack of the flow passage substrate or the like by using the pressurizing apparatus, then it may be difficult to perform the positional adjustment for the distinct member with respect to the stack on account of the adhesive adhered to the pressurizing apparatus.

In view of the above, it is conceived that a groove is provided on the surface of the flow passage substrate in order to trap or catch the surplus amount of the adhesive. However, the surplus amount of the adhesive cannot be trapped or caught appropriately depending on the configuration of the groove, and the problem may arise as described above.

An object of the present teaching is to provide a liquid discharge head which makes it possible to suppress the invasion of the liquid into the crack of the piezoelectric layer and which makes it possible to appropriately trap or catch the surplus amount of the adhesive.

According to an aspect of the present teaching, there is provided a liquid discharge head including:

a flow passage substrate which is formed with a plurality of individual flow passages, the individual flow passages including a plurality of nozzles and a plurality of pressure chambers communicated with the nozzles respectively, the pressure chambers being open on a surface of the flow passage substrate;

a sealing member which is adhered to the surface via an adhesive and configured to seal the pressure chambers; and an actuator substrate which has a piezoelectric layer and a plurality of individual electrodes, the piezoelectric layer being adhered to a surface of the sealing member on a side opposite to the flow passage substrate via an adhesive, the individual electrodes being formed on a side opposite to the sealing member with respect to the piezoelectric layer, the individual electrodes being overlapped with the pressure chambers respectively in an orthogonal direction orthogonal to the surface, wherein the sealing member is composed of a material different from a material of the piezoelectric layer, the surface has an adhesion area to which the sealing member is adhered and a non-adhesion area to which the sealing member is not adhered, and the surface is formed with:

- a first groove which extends in an extending direction directed from the adhesion area to the non-adhesion area and which spreads over the adhesion area and the non-adhesion area; and
- a second groove which extends in an intersecting direction intersecting with the extending direction in the non-adhesion area and which is connected to the first groove.

DETAILED DESCRIPTION

First Embodiment

Figure 1:
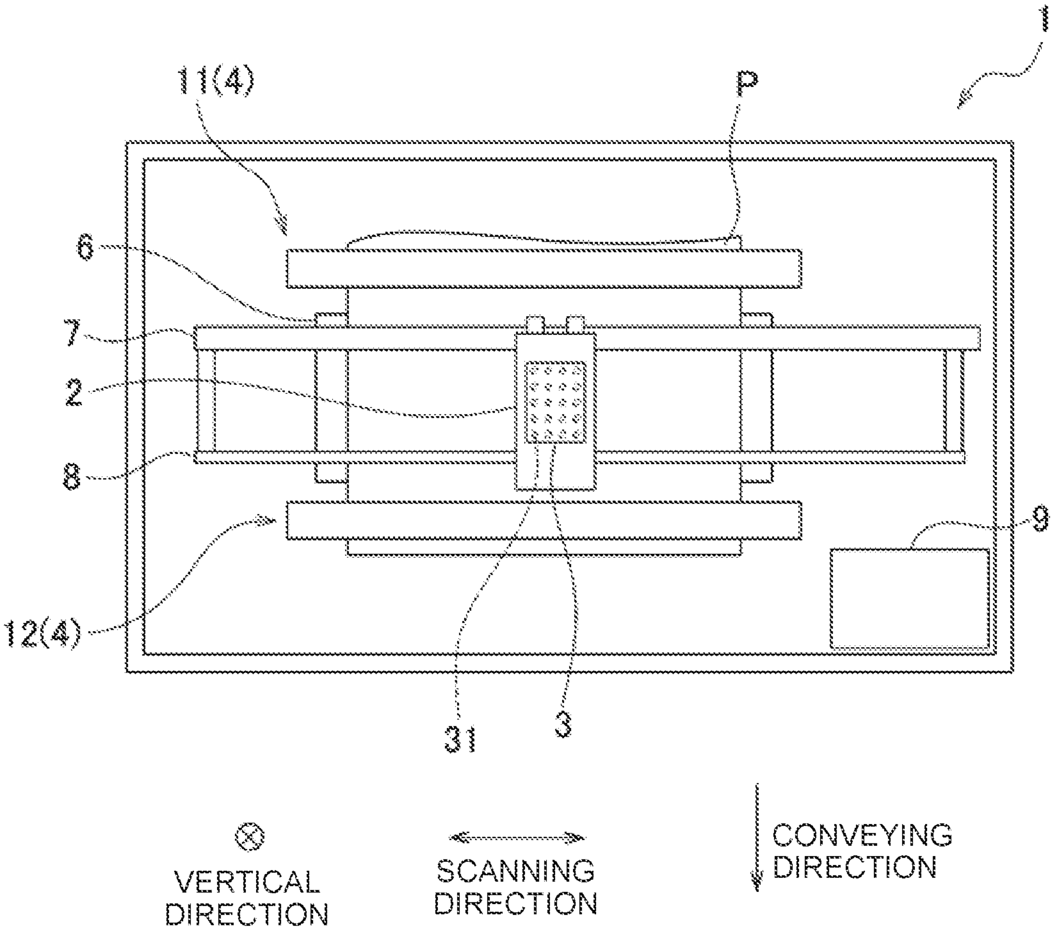
FIG. 1 is a schematic plan view of a printer including a head according to a first embodiment of the present teaching.

As depicted in FIG. 1, a head 3 according to a first embodiment of the present teaching is applied to a printer 1. The printer 1 is provided with a carriage 2 which is movable in the scanning direction (direction orthogonal to the vertical direction) while retaining the head 3, a platen 6 which supports the recording paper P under or below the head 3 and the carriage 2, and a conveying mechanism 4 which conveys the recording paper P in the conveying direction (direction orthogonal to the scanning direction and the vertical direction). A plurality of nozzles 31 are formed on a lower surface of the head 3.

The carriage 2 is supported by a pair of guide rails 7, 8 which extend in the scanning direction respectively. The carriage 2 is movable in the scanning direction along the guide rails 7, 8 in accordance with the driving of a carriage motor (not depicted).

The conveying mechanism 4 includes two roller pairs 11, 12 which are arranged at positions to interpose the platen 6 and the carriage 2 in the conveying direction. The roller pairs 11, 12 are rotated in a state in which the recording paper P is interposed, in accordance with the driving of a conveyance motor (not depicted). The roller pairs 11, 12 convey the recording paper P in the conveying direction.

Figure 2:
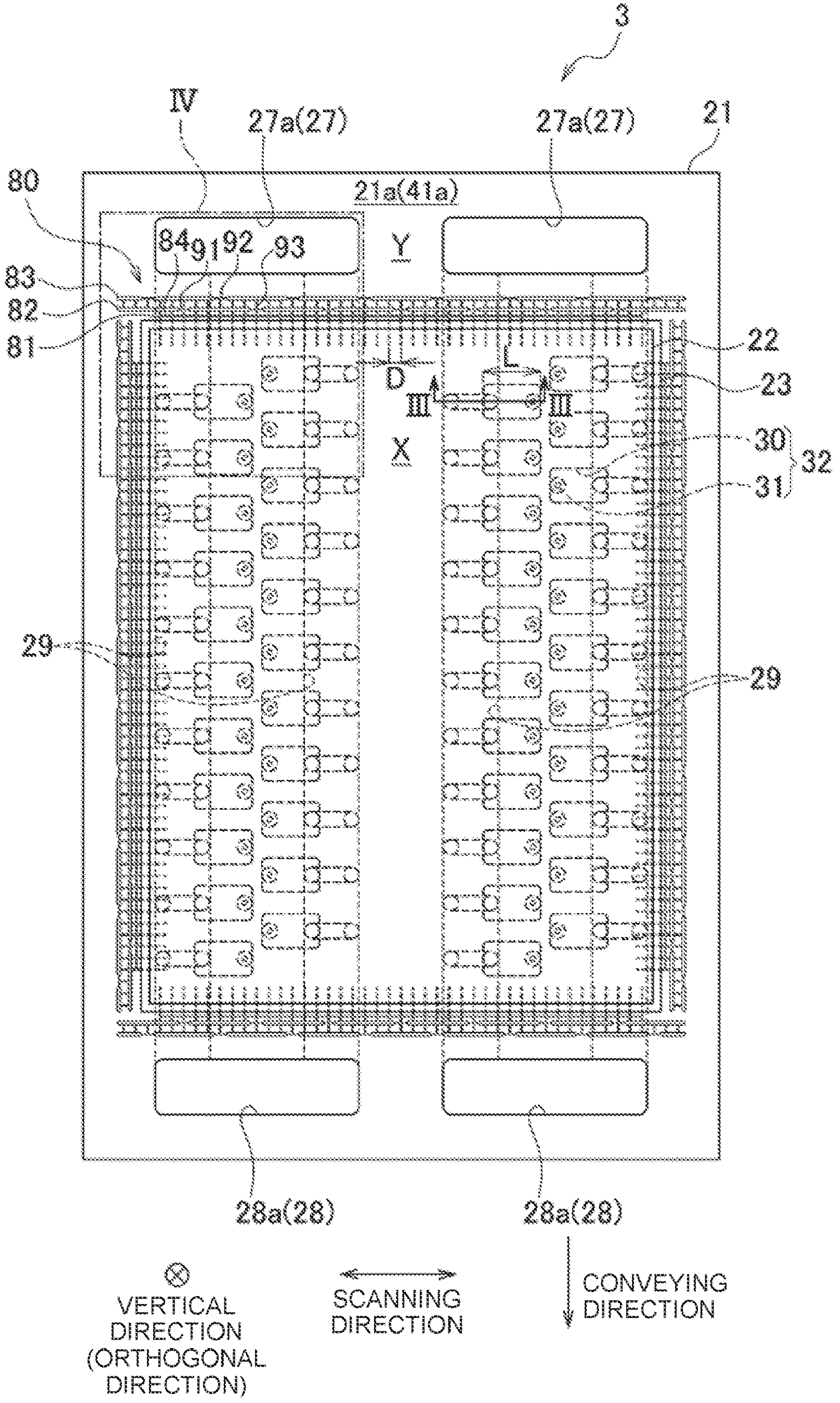
FIG. 2 is a plan view of the head.
Figure 3:
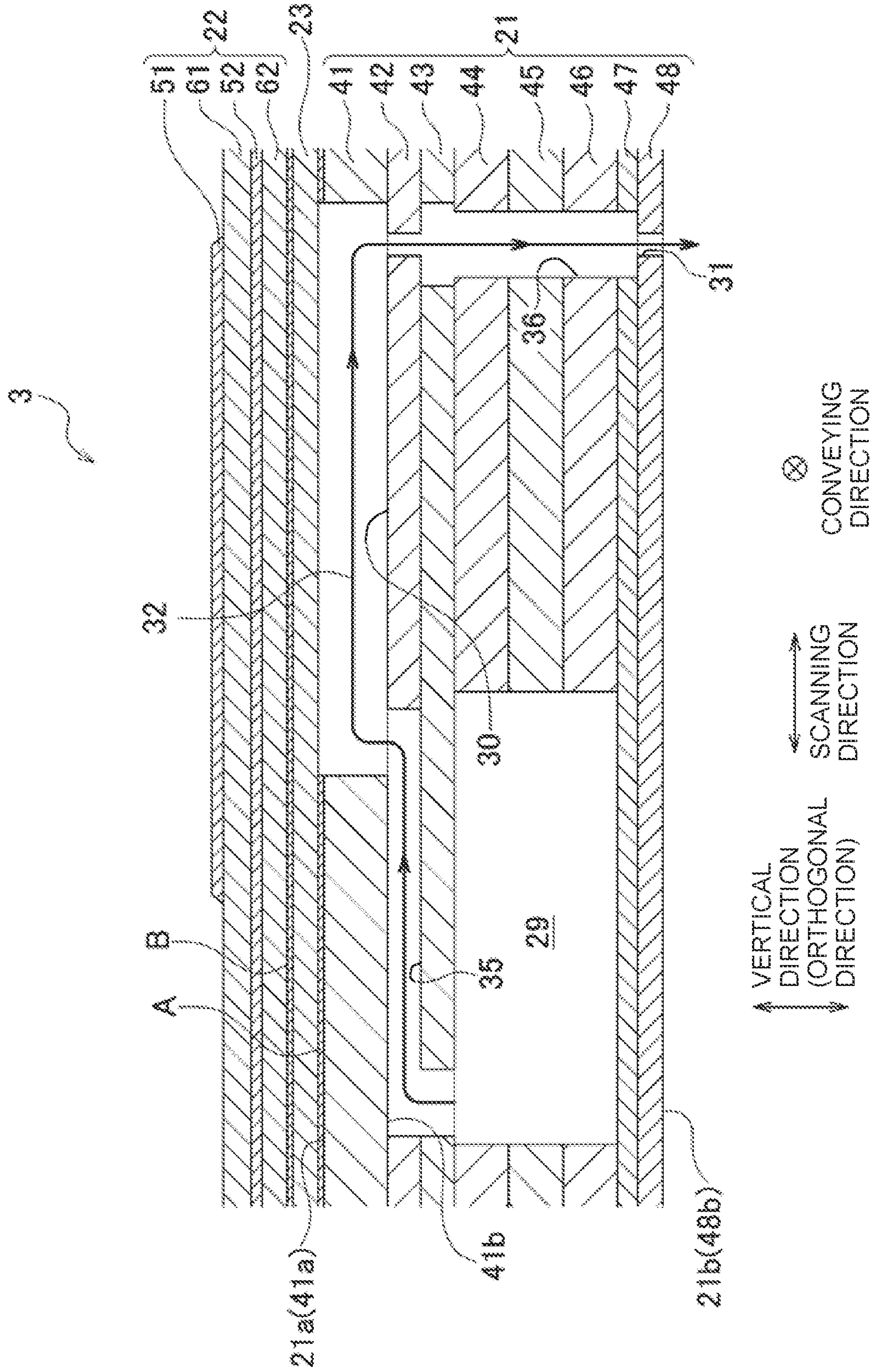
FIG. 3 is a sectional view taken along a line depicted in FIG. 2.

As depicted in FIGS. 2 and 3, the head 3 includes a flow passage substrate 21 which is formed with a plurality of nozzles 31, an actuator substrate 22 which is arranged on a surface 21*a* of the flow passage substrate 21, and a sealing member 23 which is arranged between the flow passage substrate 21 and the actuator substrate 22.

As depicted in FIG. 3, the flow passage substrate 21 is composed of eight plates 41 to 48 which are stacked in the vertical direction.

The plate 41 is formed with a plurality of pressure chambers 30. The plate 48 is formed with a plurality of nozzles 31. The surface 41*a* of the plate 41 corresponds to the surface 21*a* of the flow passage substrate 21, and the back surface 48*b* of the plate 48 corresponds to the back surface 21*b* of the flow passage substrate 21. The plurality of pressure chambers 30 are open on the surface 41*a* of the plate 41, and the plurality of nozzles 31 are open on the back surface 48*b* of the plate 48. The plate 42 is stacked on the back surface 41*b* of the plate 41 (surface disposed on a side opposite to the surface 41*a*).

The plates 43 to 46 are formed with four common flow passages 29 (see FIG. 2). The plates 42, 43 are formed with communication passages 35 each of which makes communication between the pressure chamber 30 and the common flow passage 29 for every pressure chamber 30. The plates 42 to 47 are formed with connecting passages 36 each of which connects the pressure chamber 30 and the nozzle 31 for every pressure chamber 30.

As depicted in FIG. 2, the four common flow passages 29 extend in the conveying direction respectively, and the four common flow passages 29 are aligned in the scanning direction. Each of the common flow passages 29 is provided for each pressure chamber array configured by the plurality of pressure chambers 30 arranged in the conveying direction. The four pressure chamber arrays are aligned in the scanning direction. An ink is supplied from each of the common flow passages 29 to the plurality of pressure chambers 30 belonging to each of the pressure chamber arrays via the communication passages 35 (see FIG. 3). Then, the respective actuators on the actuator substrate 22 are deformed as described later on. Accordingly, the pressure is applied to the ink contained in the pressure chamber 30, the ink passes through the connecting passage 36, and the ink is discharged from the nozzle 31.

As described above, the flow passage substrate 21 is formed with the four common flow passages 29, and the plurality of individual flow passages 32 (flow passages including the nozzles 31 and the pressure chambers 30, the flow passages ranging from the outlets of the common flow passage 29 via the pressure chambers 30 and the connecting passages 36 to arrive at the nozzles 31) which are communicated with each of the common flow passages 29.

The flow passage substrate 21 is further formed with two supply passages 27 and two return passages 28 which are communicated with an ink tank 9 (see FIG. 1) via tubes or the like respectively. Each of the supply passages 27 is communicated with the two common flow passages 29 which are adjacent to one another in the scanning direction, and the ink is supplied from the ink tank 9 to the two common flow passages 29. Each of the return passages 28 is communicated with the two common flow passages 29 which are adjacent to one another in the scanning direction, and the ink is allowed to return from the two common flow passages 29 to the ink tank 9. The supply passage 27 is arranged on the upstream side in the conveying direction of the common flow passage 29, and the return passage 28 is arranged on the downstream side in the conveying direction of the common flow passage 29.

Figure 5:
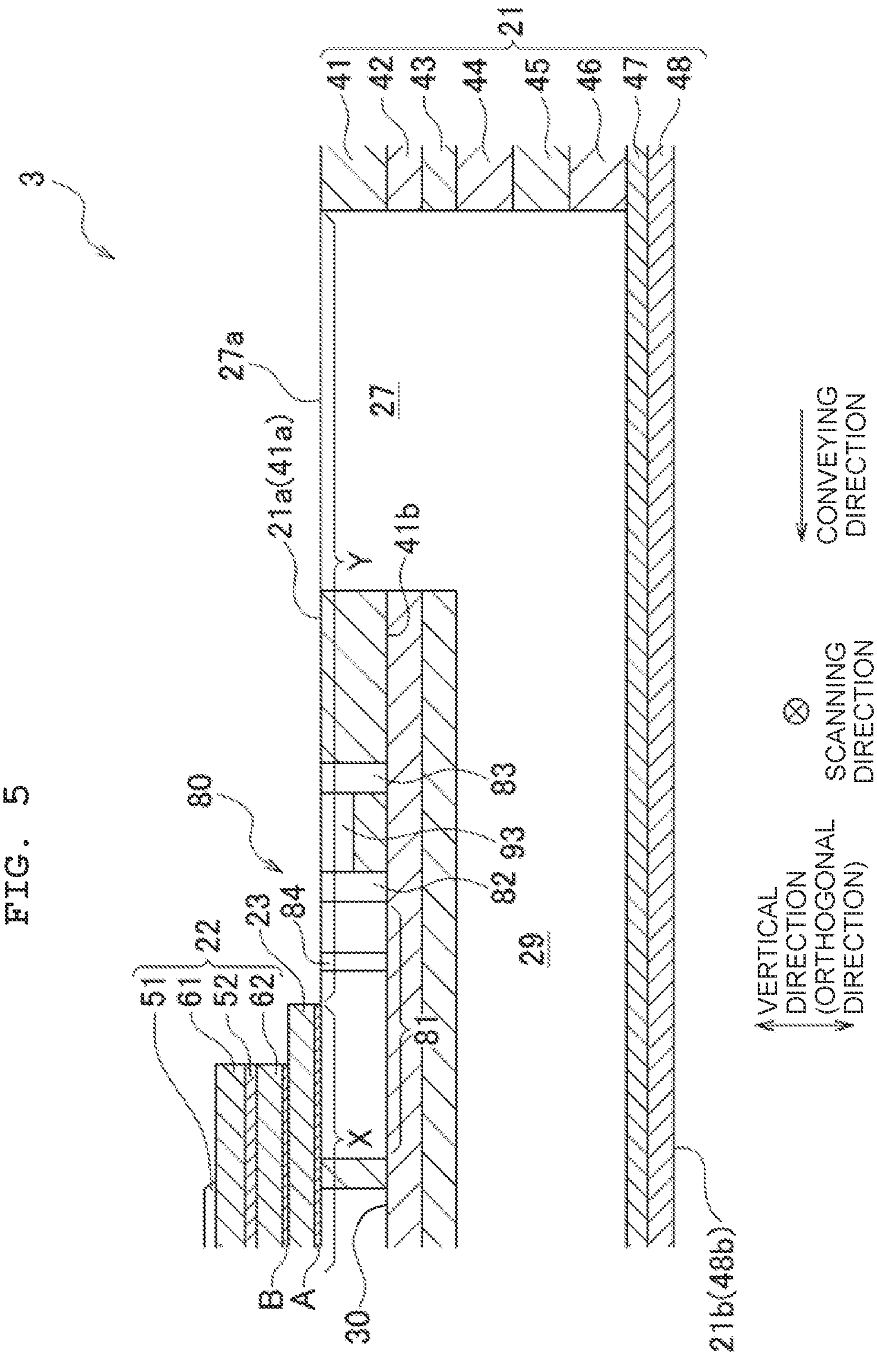
FIG. 5 is a sectional view taken along a line V-V depicted in FIG. 4.

As depicted in FIG. 5, the supply passage 27 is formed by through-holes which are formed through the plates 41 to 43, and the supply passage 27 extends in the vertical direction. The supply passage 27 is open on the surface 21*a* of the flow passage substrate 21 at the upper end, and the supply passage 27 is communicated with the common flow passage 29 at the lower end. Although not depicted, the return passage 28 is also configured by through-holes which are formed through the plates 41 to 43 in the same manner as the supply passage 27, and the return passage 28 extends in the vertical direction. The return passage 28 is open on the surface 21*a* of the flow passage substrate 21 at the upper end, and the return passage 28 is communicated with the common flow passage 29 at the lower end.

As depicted in FIG. 3, the actuator substrate 22 includes two piezoelectric layers 61, 62, a common electrode 52, and a plurality of individual electrodes 51. The piezoelectric layers 61, 62 and the common electrode 52 define the outer shape of the actuator substrate 22 depicted in FIG. 2, having a rectangular shape which is one size smaller than the flow passage substrate 21 as viewed in the vertical direction. The piezoelectric layers 61, 62 and the common electrode 52 cover all of the pressure chambers 30 formed in the flow passage substrate 21. On the other hand, the individual electrode 51 is provided for each of the pressure chambers 30, and the individual electrode 51 is overlapped with each of the pressure chambers 30 in the vertical direction (orthogonal direction orthogonal to the surface 21*a*).

As depicted in FIG. 2, the sealing member 23 has a rectangular shape which is one size smaller than the flow passage substrate 21 and which is one size larger than the actuator substrate 22 as viewed in the vertical direction. The sealing member 23 covers all of the pressure chambers 30 formed in the flow passage substrate 21 in the same manner as the piezoelectric layers 61, 62 and the common electrode 52 of the actuator substrate 22.

The plurality of individual electrodes 51 and the common electrode 52 are electrically connected to driver IC (not depicted). The driver IC maintains the electric potential of the common electrode 52 at the ground electric potential, while the driver IC changes the electric potential of the individual electrode 51 between a predetermined driving electric potential and the ground electric potential. In this case, the portion (actuator) of the piezoelectric layer 61, which is interposed by the individual electrode 51 and the common electrode 52, is shrunk in the in-plane direction in accordance with the piezoelectric transverse effect. In accordance therewith, the portions of the actuator substrate 22 and the sealing member 23, which are overlapped with the pressure chamber 30 in the vertical direction, are deformed so that the portions protrude toward the pressure chamber 30. As a result, the volume of the pressure chamber 30 is decreased, and the pressure is applied to the ink contained in the pressure chamber 30. The ink passes through the connecting passage 36, and the ink is discharged from the nozzle 31. Simultaneously therewith, the ink contained in the common flow passage 29 passes through the communication passage 35, and the ink is supplied to the pressure chamber 30. Further, the ink is supplied from the ink tank 9 to the common flow passage 29.

The sealing member 23 is composed of a material (material such as stainless steel or the like having a low ink permeability) different from a material of the piezoelectric layer 61, 62. The sealing member 23 has no portion which functions as the actuator.

As depicted in FIG. 3, the sealing member 23 is adhered to the surface 21*a* of the flow passage substrate 21 via an adhesive A, and the sealing member 23 seals the pressure chambers 30. The piezoelectric layer 62 of the actuator substrate 22 is adhered to the surface (surface disposed on a side opposite to the flow passage substrate 21) of the sealing member 23 via an adhesive B. The respective adhesives A, B may be composed of the same material, or the respective adhesives A, B may be composed of different materials.

For example, the eight plates 41 to 48, which constitute the flow passage substrate 21, are mutually stacked, followed by being adhered to one another by using a pressurizing apparatus. After that, the adhesive A is transferred to the surface 21*a* of the flow passage substrate 21, and the sealing member 23 is arranged. After that, the adhesive B is dropped or added dropwise onto the surface of the sealing member 23, and the actuator substrate 22 is arranged. Then, a stack of the flow passage substrate 21, the sealing member 23, and the actuator substrate 22 is pressurized by using the pressurizing apparatus, and the components are adhered to one another.

As depicted in FIG. 2, the surface 21*a* of the flow passage substrate 21 has an adhesion area X to which the sealing member 23 is adhered, and a non-adhesion area Y to which the sealing member 23 is not adhered. Both of a supply port 27*a* which is the opening of the supply passage 23 and a return port 28*a* which is the opening of the return passage 28 are provided in the non-adhesion area Y.

Grooves 80, which are provided in order to catch or trap the surplus amounts of the adhesives A, B, are formed over the entire circumference of the adhesion area X (on the four sides of the adhesion area X having the rectangular shape respectively). The grooves 80 are provided between the supply port 27*a* and the adhesion area X and between the return port 28*a* and the adhesion area X respectively.

The grooves 80 include a plurality of first grooves 81, a plurality of second grooves 82, a plurality of third grooves 83, a plurality of fourth grooves 84, a plurality of first connecting grooves 91, a plurality of second connecting grooves 92, and a plurality of third connecting grooves 93.

The plurality of first grooves 81 extend, on each of the sides of the adhesion area X, in the extending direction which is orthogonal to the side and which is directed from the adhesion area X to the non-adhesion area Y respectively, and the plurality of first grooves 81 spread over the adhesion area X and the non-adhesion area Y. The extending direction mutually differs in relation to the four sides of the adhesion area X. As for the four sides of the adhesion area X, the extending direction corresponds to the direction which is directed to the upstream side in the conveying direction in relation to the side disposed on the upstream side in the conveying direction, the direction which is directed to the downstream side in the conveying direction in relation to the side disposed on the downstream side in the conveying direction, one direction of the scanning direction in relation to the side disposed on one side (left side as viewed in FIG. 2) in the scanning direction, or the other direction of the scanning direction in relation to the side disposed on the other side (right side as viewed in FIG. 2) in the scanning direction.

The plurality of first grooves 81 are arranged at equal intervals D (intervals shorter than the length L of the pressure chamber 30) along each of the sides of the adhesion area X.

The plurality of second grooves 82 extend, in the non-adhesion area Y, in the direction parallel to each of the sides of the adhesion area X (intersecting direction intersecting the extending direction) respectively, and the plurality of second grooves 82 are connected to the forward ends in the extending direction of the first grooves 81. The width of the second groove 82 is larger than the width of the first groove 81.

The plurality of second grooves 82 are arranged while being separated from each other in the intersecting direction, and the plurality of second grooves 82 are connected to one another by the first connecting grooves 91. The first connecting grooves 91 extend, in the non-adhesion area Y, in the direction (intersecting direction) parallel to each of the sides of the adhesion area X in the same manner as the second grooves 82. The width of the first connecting groove 91 is smaller than the width of the second groove 82, and the width of the first connecting groove 91 is approximately the same as the width of the first groove 81.

Note that the first connecting grooves 91 are connected to the forward ends in the extending direction of the first grooves 81 in the same manner as the second grooves 82. In other words, those existing as the first grooves 81 include those connected to the second grooves 82 and those connected to the first connecting grooves 91.

The plurality of third grooves 83 extend, in the non-adhesion area Y, in the direction (intersecting direction) parallel to each of the sides of the adhesion area X in the same manner as the second grooves 82 on the downstream side in the extending direction from the second grooves 82 respectively. The width of the third groove 83 is approximately the same as the width of the second groove 82.

The plurality of third grooves 83 are arranged while being separated from each other in the intersecting direction, and the plurality of third grooves 83 are connected to one another by the second connecting grooves 92. The second connecting grooves 92 extend, in the non-adhesion area Y, in the direction (intersecting direction) parallel to each of the sides of the adhesion area X on the downstream side in the extending direction from the second grooves 82 in the same manner as the third grooves 83. The width of the second connecting groove 92 is smaller than the width of the third groove 83, and the width of the second connecting groove 92 is approximately the same as the width of the first groove 81 and the width of the first connecting groove 91.

The groove group, which includes the second grooves 82 and the first connecting grooves 91, is mutually connected to the groove group which includes the third grooves 83 and the second connecting grooves 92, by means of the third connecting grooves 93. The third connecting grooves 93 extend in the extending direction (direction orthogonal to each of the sides of the adhesion area X and directed from the adhesion area X to the non-adhesion area Y) in the same manner as the first grooves 81. The third connecting groove 93 has approximately the same width as that of the first groove 81. The plurality of third connecting grooves 93 are arranged at the same intervals D as those of the first grooves 81 (see FIG. 2) along each of the sides of the adhesion area X. The third connecting grooves 92 are arranged in one array in the extending direction with respect to the first grooves 81 with the second grooves 82 or the first connecting grooves 91 intervening therebetween except for the three third connecting grooves 93 disposed at each of the both ends in the direction (intersecting direction) parallel to each of the sides of the adhesion area X.

The plurality of fourth grooves 84 extend, in the non-adhesion area Y, in the direction (intersecting direction) parallel to each of the sides of the adhesion area X on the upstream side in the extending direction from the second grooves 82 respectively. The plurality of fourth grooves 84 connect the plurality of first grooves 81 arranged along the side. The width of the fourth groove 94 is approximately the same as the width of the first groove 81.

As depicted in FIG. 5, the second groove 82 and the third groove 83 are formed by through-holes formed through the plate 41 (first plate). Further, in this embodiment, the first groove 81 is also formed by a through-hole formed through the plate 41. On the other hand, the fourth groove 84 and the connecting grooves 91 to 93 are configured by recesses formed on the surface 41*a* of the plate 41 (see the fourth groove 84 and the connecting groove 93 depicted in FIG. 5).

As described above, according to this embodiment, the sealing member 23, which seals the pressure chambers 30, is provided between the flow passage substrate 21 and the piezoelectric layer 62 (see FIGS. 3 and 5). Accordingly, even if any crack appears in the piezoelectric layer 62, it is possible to suppress the invasion of the ink into the crack. Further, the first groove 81 which extends in the extending direction directed from the adhesion area X to the non-adhesion area Y and which spreads over the adhesion area X and the non-adhesion area Y, and the second groove 82 which extends in the intersecting direction intersecting the extending direction in the non-adhesion area Y and which is connected to the first groove 81 are formed on the surface 21*a* of the flow passage substrate 21 (see FIGS. 2 and 4). Accordingly, the surplus amounts of the adhesives A, B, which flow from the adhesion area X to the non-adhesion area Y along the first grooves 81, are trapped or caught by the second grooves 82. It is possible to appropriately trap or catch the surplus amounts of the adhesives A, B (consequently, it is possible to suppress such a problem that the adhesives A, B adheres to any other member).

The plurality of first grooves 81 and the plurality of second grooves 82 are formed over the entire circumference of the adhesion area X (see FIG. 2). In this case, it is possible to appropriately trap or catch the surplus amounts of the adhesives A, B over the entire circumference of the adhesion area X.

The first grooves 81 and the second grooves 82 are provided between the supply port 27*a* and the adhesion area X and between the return port 28*a* and the adhesion area X respectively (see FIG. 2). In this case, the surplus amounts of the adhesives A, B are suppressed from flowing into the supply port 27*a* and the return port 28*a*. It is possible to avoid, for example, such an inconvenience that the supply port 27*a* and/or the return port 28*a* is/are blocked by the adhesives A, B.

The first grooves 81 are configured by the through-holes formed through the plate 41 (see FIG. 5). In this case, the first grooves 81 can be deeply formed. Larger amounts of the surplus amounts of the adhesives A, B can be allowed to flow from the adhesion area X to the non-adhesion area Y, and the adhesives A, B can be trapped or caught by the second grooves 82.

Figure 4:
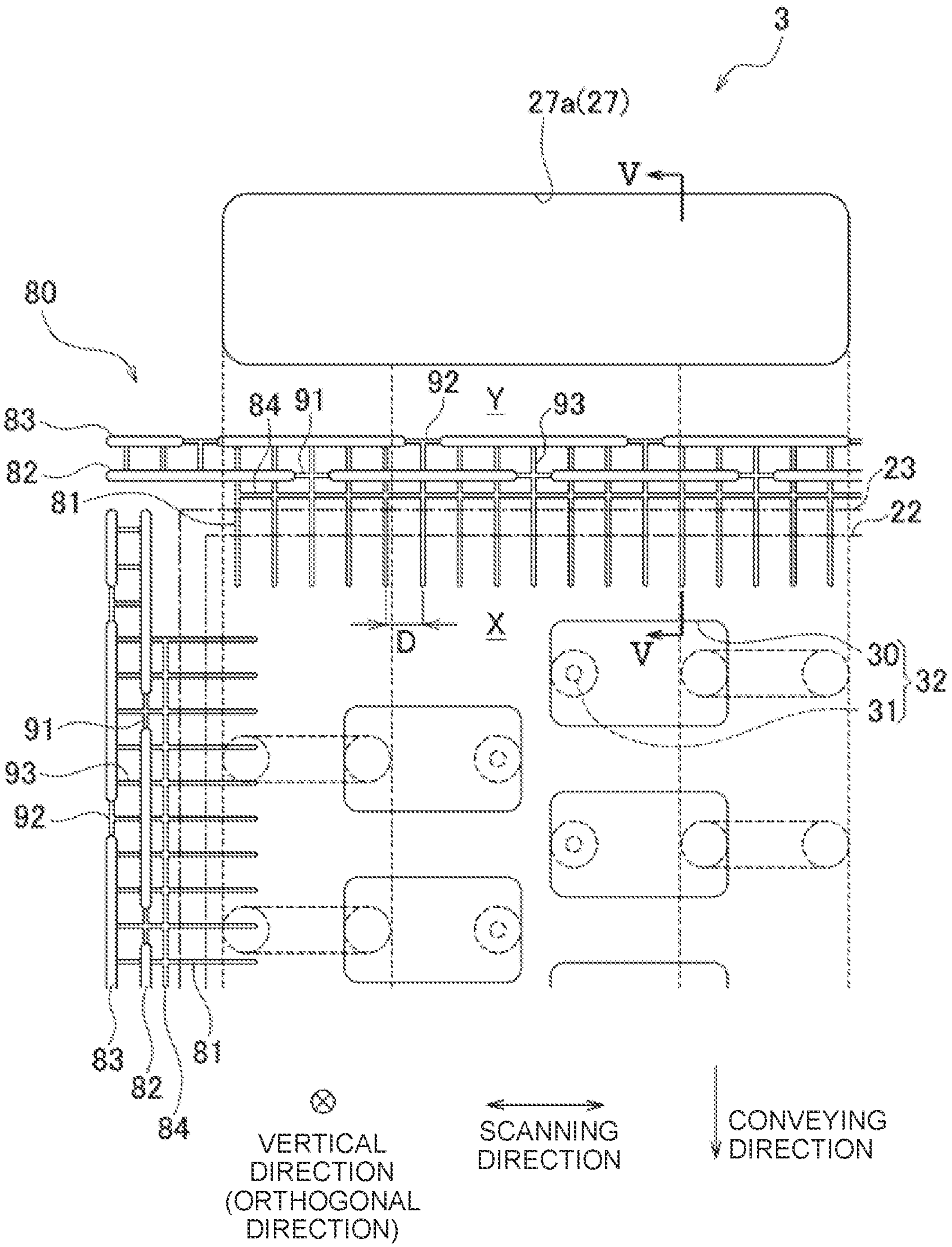
FIG. 4 is an enlarged view of an are IV depicted in FIG. 2.

The plurality of second grooves 82, which are configured by the through-holes formed through the plate 41, are connected to one another by the first connecting grooves 91 which are configured by the recesses formed on the surface 41*a* of the plate 41 (see FIG. 4). When the second groove 82 is provided over a predetermined length, if one second groove 82 is formed, then the second groove 82, which is composed of a through-hole, has a long length, and hence the rigidity of the plate 41 is consequently lowered. In relation thereto, according to the configuration of the present teaching, the plurality of second grooves 82 are connected by the first connecting grooves 91 composed of the recesses. Accordingly, it is possible to shorten the respective lengths of the plurality of second grooves 82 composed of the through-holes. It is possible to suppress the decrease in the rigidity of the plate 41.

Those formed on the surface 21*a* of the flow passage substrate 21 are not limited to only the first grooves 81 and the second grooves 82. The third grooves 83, which extend in the intersecting direction, are further formed on the downstream side in the extending direction from the second grooves 82 in the non-adhesion area Y (see FIG. 4). In this case, parts of the surplus amounts of the adhesives A, B allowed to flow from the adhesion area X to the non-adhesion area Y along the first grooves 81, which are not trapped by the second grooves 82 and which are allowed to further flow to the downstream side in the extending direction, can be trapped by the third grooves 83. Therefore, it is possible to more appropriately trap the surplus amounts of the adhesives A, B (consequently, it is possible to more reliably suppress such a problem that the adhesives A, B adhere to any other member).

The plurality of third grooves 83, which are configured by the through-holes formed through the plate 41, are connected to one another by the second connecting grooves 92 which are configured by the recesses formed on the surface 41*a* of the plate 41 (see FIG. 4). When the third groove 83 is provided over a predetermined length, if one third groove 83 is formed, then the third groove 83, which is composed of a through-hole, has a long length, and hence the rigidity of the plate 41 is consequently lowered. In relation thereto, according to the configuration of the present teaching, the plurality of third grooves 83 are connected by the second connecting grooves 92 composed of the recesses. Accordingly, it is possible to shorten the respective lengths of the plurality of third grooves 83 composed of the through-holes. It is possible to suppress the decrease in the rigidity of the plate 41.

The groove group, which includes the second grooves 82 and the first connecting grooves 91, is mutually connected to the groove group which includes the third grooves 83 and the second connecting grooves 92, by means of the third connecting grooves 93 which are configured by the recesses formed on the surface 41*a* of the plate 41. In this case, the routes to trap the surplus amounts of the adhesives A, B are increased. It is possible to more appropriately trap the surplus amounts of the adhesives A, B (consequently, it is possible to more reliably suppress such a problem that the adhesives A, B adhere to any other member).

Those formed on the surface 21*a* of the flow passage substrate 21 are not limited to only the first grooves 81 and the second grooves 82. The fourth grooves 84, which extend in the intersecting direction, are further formed on the upstream side in the extending direction from the second grooves 82 in the non-adhesion area Y. The fourth grooves 84 have the lengths in the extending direction shorter than the lengths of the second grooves 82. The fourth grooves 84 connect the plurality of first grooves 81 (see FIG. 4). In this case, the routes to trap the surplus amounts of the adhesives A, B are increased. It is possible to more appropriately trap the surplus amounts of the adhesives A, B (consequently, it is possible to more reliably suppress such a problem that the adhesives A, B adhere to any other member).

The plurality of first grooves 81 are arranged while being separated from each other in the intersecting direction, with the intervals D shorter than the length L of the pressure chamber 30 (see FIG. 2). In this case, the first grooves 81 are densely arranged, and hence the effect is enhanced to trap the surplus amounts of the adhesives A, B (consequently, it is possible to more reliably suppress such a problem that the adhesives A, B adhere to any other member).

Second Embodiment

Figure 6:
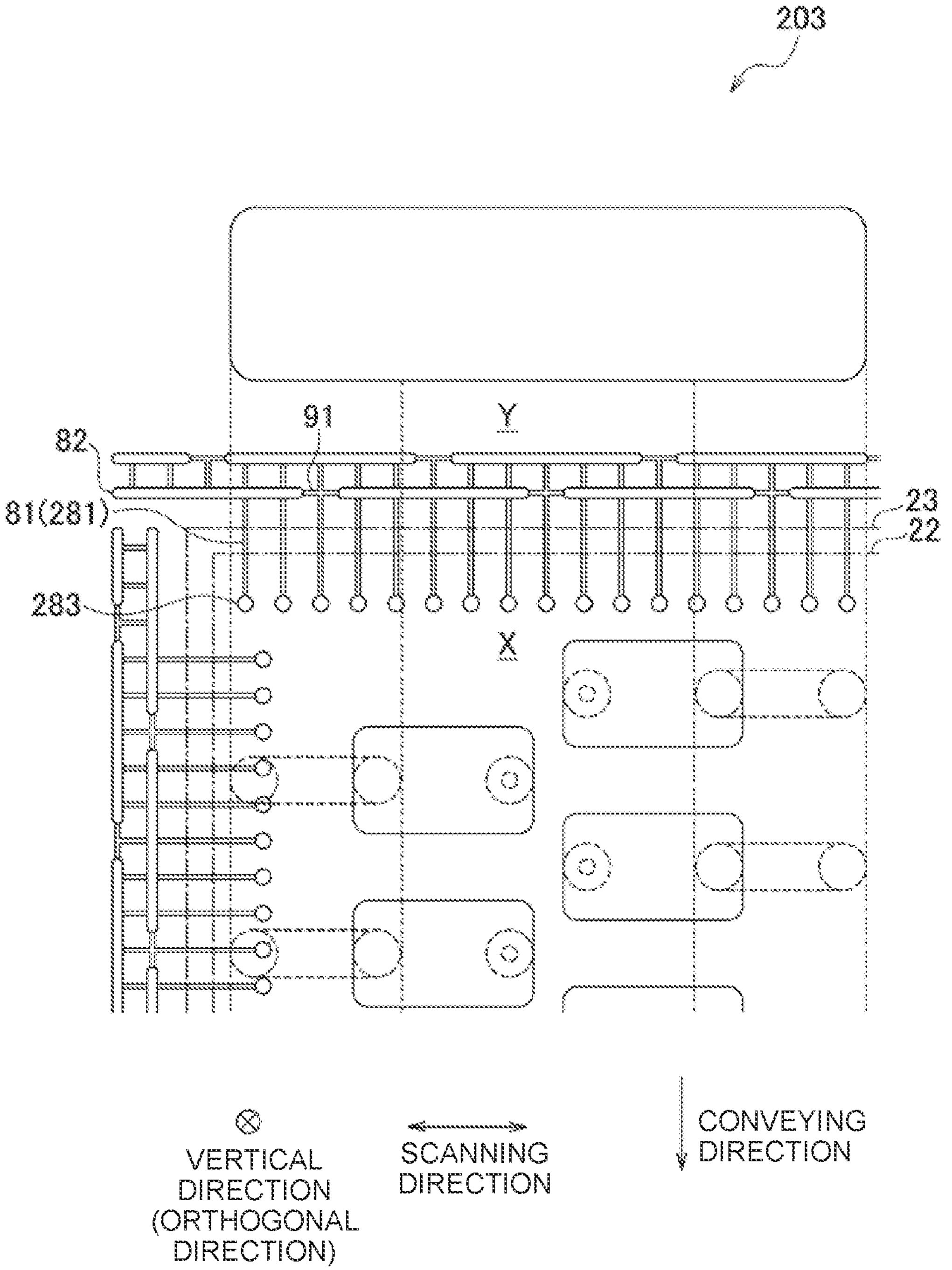
FIG. 6 is an enlarged view corresponding to FIG. 4, illustrative of first recesses formed on a surface of a plate in a second embodiment of the present teaching.

Next, an explanation will be made about a head 203 according to a second embodiment of the present teaching with reference to FIGS. 6 to 8.

In the first embodiment (see FIG. 4), the first grooves 81 are configured by the through-holes which are formed through the plate 41 disposed at the uppermost layer of the flow passage substrate 21 (see FIG. 5). On the contrary, in the second embodiment (see FIG. 6), first grooves 81 are configured by first recesses 281 which are formed on the plate 41. Further, in the second embodiment (see FIG. 7), second recesses 282 are not formed on the back surface 41*b* of the plate 41.

In the second embodiment (see FIG. 6), the proximal ends in the extending direction of the respective first grooves 81 (first recesses 281) are communicated with atmosphere communication holes 283. The atmosphere communication hole 283 is configured by a through-hole which is formed through the plate 41, and the atmosphere communication hole 283 is communicated with the atmosphere via a connecting passage (not depicted).

The second recesses 282 (see FIG. 7) include a plurality of straight portions 282*a* which extend in the extending direction (direction which is orthogonal to the side on each of the sides of the adhesion area X and which is directed from the adhesion area X to the non-adhesion area Y) in the same manner as the first recesses 281, and curved portions 282*b* each of which connects the two straight portions 282*a* adjacent to one another in the direction (intersecting direction intersecting the extending direction) parallel to each of the sides of the adhesion area X. The straight portion 282*a* spreads over the adhesion area X and the non-adhesion area Y, and the straight portion 282*a* is connected to the second groove 82 or the first connecting groove 91 at the forward end in the extending direction. The curved portion 282*b* is communicated with the atmosphere communication hole 283.

Figure 8:
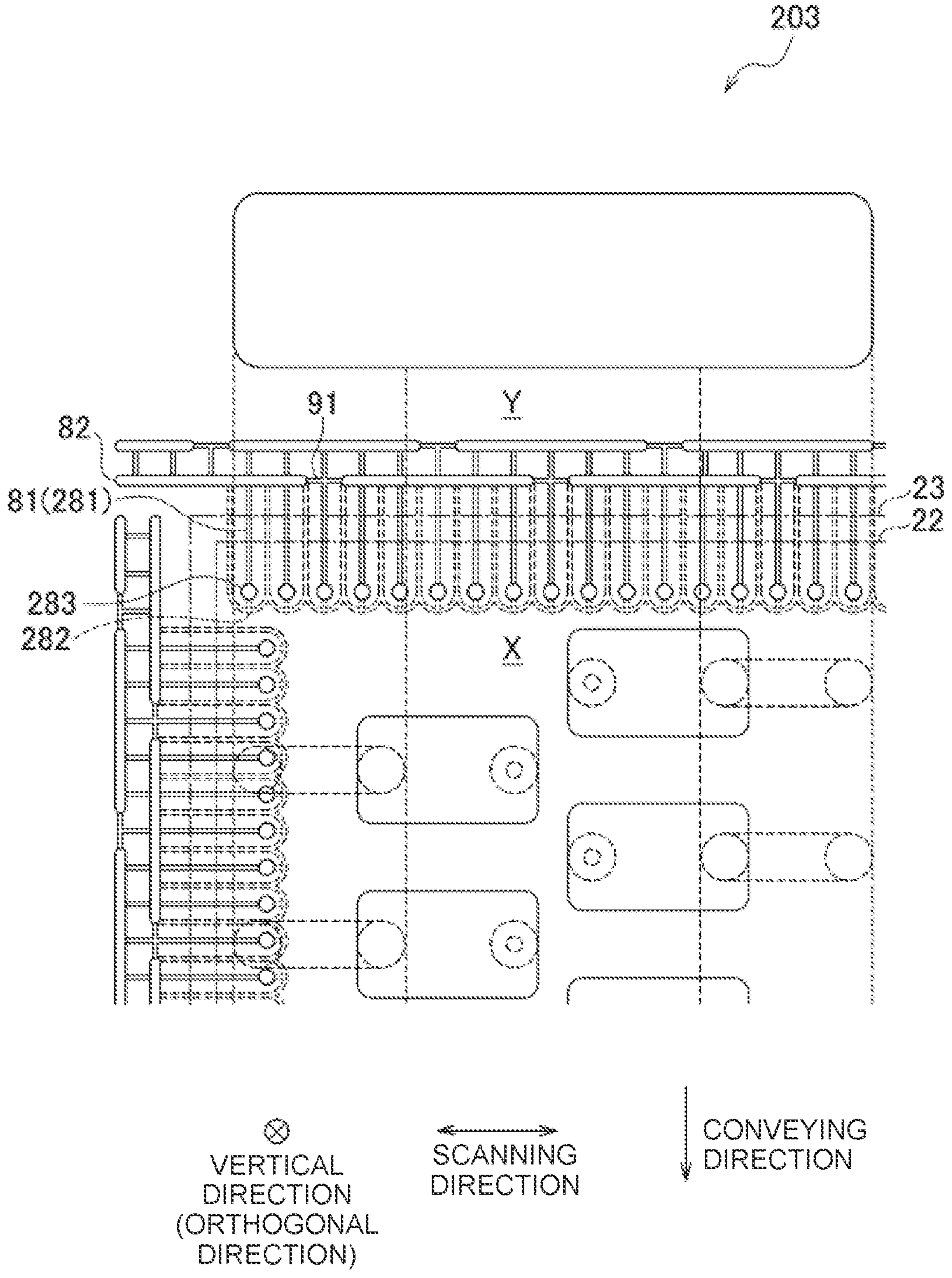
FIG. 8 is an enlarged view corresponding to FIG. 4, illustrative of a relationship between first recesses and second recesses in the second embodiment of the present teaching.

As depicted in FIG. 8, the first recesses 281 and the second recesses 282 are not overlapped with each other in the orthogonal direction. The first recess 281 is arranged between the two straight portions 282*a* of the second recess 282 which are adjacent to one another in the intersecting direction. Further, the curved portion 282*b* is arranged on the upstream side in the extending direction with respect to each of the first recesses 281.

As described above, according to this embodiment, the first grooves 81 are configured by the first recesses 281 formed on the plate 41. Thus, it is possible to secure the rigidity of the plate 41 as compared with the case in which the first grooves 81 are configured by the through-holes (see FIG. 5). Further, the first recesses 281 are communicated with the atmosphere via the atmosphere communication holes 283. Thus, it is possible to avoid any clog-up with the adhesives A, B in the first grooves 81 (first recesses 281). The surplus amounts of the adhesives A, B can be allowed to smoothly flow from the adhesion area X to the non-adhesion area Y via the first grooves 81 (first recesses 281).

Both of the first recesses 281 formed on the surface 41*a* of the plate 41 and the second recesses 282 formed on the back surface 41*b* of the plate 41 are connected to the second grooves 82. Accordingly, the surplus amounts of the adhesives A, B, which exist between the plate 41 and the sealing member 23 (see FIG. 5), can be not only trapped by the second grooves 82 by the aid of the first grooves 81 (first recesses 281), but the surplus amounts of the adhesives, which exist between the plate 41 and the plate 42, can be also trapped by the second grooves 82 by the aid of the second recesses 282.

The first recesses 281 and the second recesses 282 are not overlapped with each other in the orthogonal direction (see FIG. 8). If the first recesses 281 and the second recesses 282 are overlapped with each other in the orthogonal direction, the rigidity of the plate 41 is consequently lowered. In relation thereto, according to the configuration of this embodiment, it is possible to suppress the decrease in the rigidity of the plate 41.

Figure 7:
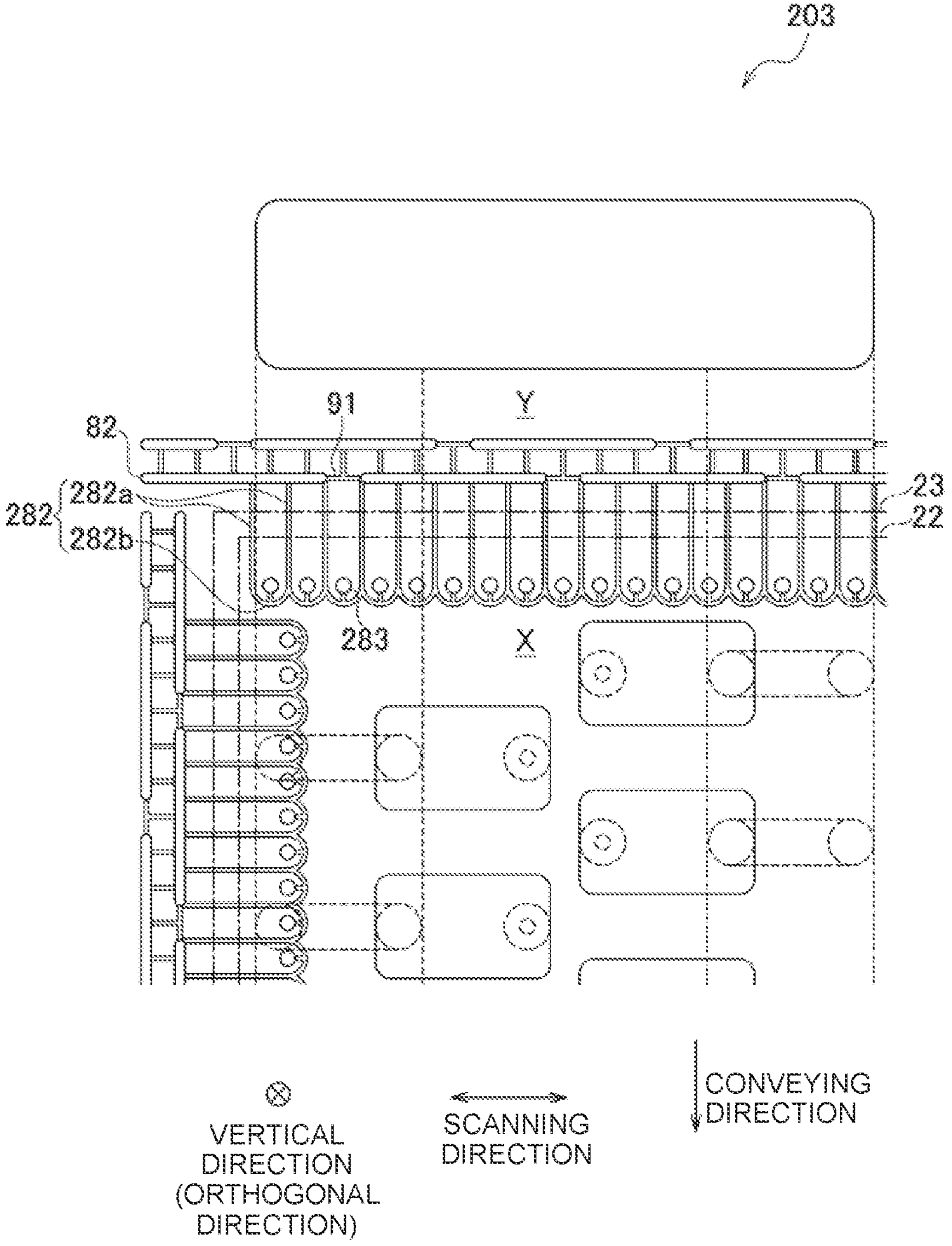
FIG. 7 is an enlarged view corresponding to FIG. 4, illustrative of second recesses formed on a back surface of the plate in the second embodiment of the present teaching.

The second recesses 282 are communicated with the atmosphere via the atmosphere communication hole 283 (see FIG. 7). Accordingly, it is possible to avoid any clog-up with the adhesives in the second recesses 282. The surplus amounts of the adhesives, which exist between the plate 41 and the plate 42, can be allowed to smoothly flow from the adhesion area X to the non-adhesion area Y.

Modified Embodiments

The preferred embodiments of the present teaching have been explained above. However, the present teaching is not limited to the embodiments described above, for which it is possible to variously change the design within a scope defined in claims.

In the embodiment described above (see FIG. 2), the grooves 80 are formed over the entire circumference of the adhesion area X. However, there is no limitation thereto. For example, the grooves 80 may be formed between the adhesion area X and the supply port 27*a* or the return port 28*a*. It is also allowable that any groove 80 is not formed on the both sides in the scanning direction with respect to the adhesion area X.

In the embodiment described above (see FIG. 2), the plurality of second grooves 82 are arranged while being separated from each other along each of the sides of the adhesion area X. However, there is no limitation thereto. For example, one lengthy second groove may be provided for each of the sides of the adhesion area X. Further, an annular second groove, which surrounds the entire circumference of the adhesion area X, may be provided. However, when the annular second groove is provided, the members are separated from each other at the boundary of the second groove, if the second groove is configured by a through-hole. Therefore, it is preferable that the second groove is configured by a recess.

In the embodiment described above (see FIG. 2), the extending direction (direction in which the first groove 81 extends) is orthogonal to the side of the adhesion area X.

However, there is no limitation thereto. It is enough that the extending direction intersects the side.

For example, it is also allowable to omit the third grooves 83, the fourth grooves 84, and the connecting grooves 91 to 93.

The present teaching is not limited to the printer, which is also applicable, for example, to facsimiles, copying machines, and multifunction machines. Further, the present teaching is also applicable to any liquid discharging apparatus which is useable for any way of use other than the image recording (for example, a liquid discharging apparatus for forming a conductive pattern by discharging a conductive liquid to a substrate).

What is claimed is:

1. A liquid discharge head comprising:

a flow passage substrate which is formed with a plurality of individual flow passages, the individual flow passages including a plurality of nozzles and a plurality of pressure chambers communicated with the nozzles respectively, the pressure chambers being open on a surface of the flow passage substrate;

a sealing member which is adhered to the surface via an adhesive and configured to seal the pressure chambers; and an actuator substrate which has a piezoelectric layer and a plurality of individual electrodes, the piezoelectric layer being adhered to a surface of the sealing member on a side opposite to the flow passage substrate via an adhesive, the individual electrodes being formed on a side opposite to the sealing member with respect to the piezoelectric layer, the individual electrodes being overlapped with the pressure chambers respectively in an orthogonal direction orthogonal to the surface, wherein the sealing member is composed of a material different from a material of the piezoelectric layer, the surface has an adhesion area to which the sealing member is adhered and a non-adhesion area to which the sealing member is not adhered, and the surface is formed with:

a first groove which extends in an extending direction directed from the adhesion area to the non-adhesion area and which spreads over the adhesion area and the non-adhesion area; and a second groove which extends in an intersecting direction intersecting with the extending direction in the non-adhesion area and which is connected to the first groove.

2. The liquid discharge head according to claim 1, wherein a plurality of first grooves including the first groove and a plurality of second grooves including the second groove are formed over an entire circumference of the adhesion area.

3. The liquid discharge head according to claim 1, wherein an opening, which is communicated with the individual flow passages, is formed in the non-adhesion area, and the first groove and the second groove are provided between the opening and the adhesion area.

4. The liquid discharge head according to claim 1, wherein the flow passage substrate includes a first plate which has the surface and a second plate which is stacked on a back surface of the first plate on a side opposite to the surface, and the first groove is formed by a through-hole which is formed through the first plate.

5. The liquid discharge head according to claim 1, wherein the flow passage substrate includes a first plate which has the surface and a second plate which is stacked on a back surface of the first plate on a side opposite to the surface, the first groove is formed by a first recess which is formed on the surface of the first plate, and the first plate is formed with an atmosphere communication hole through which the first recess communicates with atmosphere.

6. The liquid discharge head according to claim 5, wherein the second groove is formed by a through-hole which is formed through the first plate, a second recess, which extends in the extending direction and which spreads over the adhesion area and the non-adhesion area, is formed on the back surface of the first plate, and the second recess is connected to the second groove.

7. The liquid discharge head according to claim 6, wherein the first recess and the second recess are not overlapped with each other in the orthogonal direction.

8. The liquid discharge head according to claim 6, wherein the second recess is communicated with the atmosphere communication hole.

9. The liquid discharge head according to claim 1, wherein the flow passage substrate includes a first plate which has the surface and a second plate which is stacked on a back surface of the first plate on a side opposite to the surface, the second groove is formed by a through-hole which is formed through the first plate, a plurality of second grooves including the second groove are arranged on the surface while being separated from each other in the intersecting direction, a plurality of first connecting grooves, which are formed by a plurality of recesses, are further formed on the surface, and each of the first connecting grooves connects two of the second grooves which are adjacent to one another in the intersecting direction.

10. The liquid discharge head according to claim 9, wherein a third groove, which extends in the intersecting direction, is further formed on a downstream side in the extending direction from the second grooves in the non-adhesion area.

11. The liquid discharge head according to claim 10, wherein the third groove is formed by a through-hole which is formed through the first plate, a plurality of third grooves including the third groove are arranged on the surface while being separated from each other in the intersecting direction, a plurality of second connecting grooves, which are formed by a plurality of recesses, are further formed on the surface, and each of the second connecting grooves connects two of the third grooves which are adjacent to one another in the intersecting direction.

12. The liquid discharge head according to claim 11, wherein a third connecting groove, which is formed by a recess, is further formed on the surface, and a groove group which includes the second grooves and the first connecting grooves and a groove group which includes the third grooves and the second connecting grooves are connected to one another by the third connecting groove.

13. The liquid discharge head according to claim 9, wherein a plurality of first grooves including the first groove are formed over an entire circumference of the adhesion area, a fourth groove, which extends in the intersecting direction and which connect the first grooves, is further formed on an upstream side in the extending direction from the second grooves in the non-adhesion area, and the fourth groove has a length in the extending direction shorter than a length in the extending direction of the second groove.

14. The liquid discharge head according to claim 1, wherein a plurality of first grooves including the first groove are formed on the surface, and the first grooves are arranged while being separated from each other in the intersecting direction, with a spacing distance which is shorter than a length of each of the pressure chambers.

* * * * *